(12) United States Patent
Sreedharan et al.

(10) Patent No.: US 12,360,761 B2
(45) Date of Patent: Jul. 15, 2025

(54) MACHINE LEARNING-BASED PREDICTION OF COMPLETION TIME OF SOFTWARE CODE CHANGES

(71) Applicant: Dell Products L.P., Round Rock, TX (US)

(72) Inventors: Vineeth Sreedharan, Bangalore (IN); Kishore Gr, Mysore (IN); Tamilarasan Janakiraman, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 75 days.

(21) Appl. No.: 17/536,654

(22) Filed: Nov. 29, 2021

(65) Prior Publication Data

US 2023/0168883 A1 Jun. 1, 2023

(51) Int. Cl.
*G06N 20/00* (2019.01)
*G06F 8/30* (2018.01)
*G06F 8/70* (2018.01)

(52) U.S. Cl.
CPC .............. *G06F 8/70* (2013.01); *G06F 8/30* (2013.01); *G06N 20/00* (2019.01)

(58) Field of Classification Search
CPC .............. G06N 20/00; G06F 8/30; G06F 8/70
See application file for complete search history.

(56) References Cited

U.S. PATENT DOCUMENTS

| | | | | |
|---|---|---|---|---|
| 2007/0294684 A1* | 12/2007 | Kumashiro | ............... | G06F 8/65 717/168 |
| 2009/0150878 A1* | 6/2009 | Pathak | ...................... | G06F 8/65 717/172 |
| 2017/0364824 A1* | 12/2017 | Boyer | ...................... | G06N 5/00 |
| 2020/0147791 A1* | 5/2020 | Safary | .................... | G06N 20/00 |
| 2021/0055995 A1* | 2/2021 | Biernacki | ........... | G06F 11/1417 |

(Continued)

OTHER PUBLICATIONS

Castrounis, Alex, "Software Development Time Estimation Issues and Alternative Approaches", https://www.innoarchitech.com/blog/software-development-time-estimation-issues-and-alternative-approaches, downloaded on Nov. 17, 2021.

(Continued)

*Primary Examiner* — Ziaul A Chowdhury
(74) *Attorney, Agent, or Firm* — Ryan, Mason & Lewis, LLP

(57) ABSTRACT

Techniques are provided for machine learning-based prediction of completion time of software code changes. One method comprises obtaining events related to software code changes; applying the events to a machine learning model that predicts a completion time of the software code changes, wherein the machine learning model is trained using (i) events for historical software code changes and (ii) a completion time for each historical software code change; and performing a remedial action based on the predicted completion time. The remedial action may comprise generating a notification, and/or adjusting an allocation of resources assigned to a completion of the software code changes. The software code changes can be monitored and a new event related to the software code changes can be applied to the machine learning model to obtain an updated predicted completion time for the changes to the software code.

20 Claims, 11 Drawing Sheets

(56) References Cited

U.S. PATENT DOCUMENTS

2021/0263728 A1* 8/2021 Farrier .................... G06F 17/18
2022/0350588 A1* 11/2022 Liao .......................... G06F 8/65

OTHER PUBLICATIONS

Shiklo, Boris, "Steps to Nail Software Development Time Estimation", htttps://www.scnsoft.com/blog/software-development-time, dated Dec. 16, 2019, downloaded on Nov. 17, 2021.

"Time Estimation in Software Development", https://medium.com/globalluxsoft/time-estimation-in-software-development-a4a495c8eb6c; Globalluxsoft, dated Jan. 31, 2018, downloaded on Nov. 17, 2021.

"How to Estimate Software Development Time?", https://www.binaryfolks.com/blog/how-to-estimate-software-development-time; downloaded on Nov. 17, 2021.

Mills, Kelley, "How Do I Automate the Estimated Completion Date", https://community.atlassian.com/t5/Jira-questions/How-Do-I-Automate-the-Estimated-Completion-Date/qaq-p/1686709,dated May 6, 2021, downloaded on Nov. 23, 2021.

* cited by examiner

| DESIGNATED SOFTWARE DEVELOPMENT EVENTS 300 |
|---|
| CREATE BRANCH |
| CODE CHANGE |
| COMMIT CHANGE |
| PULL REQUEST |
| REVIEWER COMMENT |
| MERGE REQUEST |
| CONTINUOUS INTEGRATION/CONTINUOUS DEPLOYMENT EVENT |
| CODE ANALYSIS TOOL EVENT |

FIG. 3

| PRODUCT DEVELOPMENT TOOL DASHBOARD 400 | | |
|---|---|---|
| PULL REQUEST IDENTIFIER | PREDICTED CLOSURE TIME FLAG | AUTOMATED ACTION |
| PULL REQUEST 1 | ON TIME | |
| PULL REQUEST 2 | ON TIME | |
| PULL REQUEST 3 | DELAYED – OCCURS AFTER SPRINT CLOSURE DATE | SPRINT TEAM NOTIFIED THAT PULL REQUEST 3 NEEDS ATTENTION; AND RECOMMEND ALLOCATION OF ADDITIONAL RESOURCES TO COMPLETION OF PULL REQUEST 3 |
| ... | ... | ... |
| PULL REQUEST N | ON TIME | |

FIG. 4

```
WHILE:
    CONTINUOUSLY GATHER DATA FROM SOFTWARE DEVELOPMENT SERVER(S) 110
    IF NEW DATA AVAILABLE:
        TRAIN INPUT LAYER OF MODEL 124 AND PROVIDE TRAINING OUTPUT TO OUTPUT LAYER:
            TRAIN WITH i=24 EPOCH(S):
                IF TRAINING ACCURACY VALUE > 90%:
                    TRAINING PASSES
                ELSE:
                    WHILE TRAINING ACCURACY VALUE <= 90%:
                        CONSIDER TIME DIFFERENCES BETWEEN SUBSEQUENT EVENTS:
                            TRAIN WITH TRAINING DATA FOR EPOCH(i)
```

FIG. 7

MACHINE LEARNING-BASED PREDICTION OF COMPLETION TIME OF SOFTWARE CODE CHANGES

FIELD

The field relates generally to information processing systems and more particularly, to the processing of software code changes in such information processing systems.

BACKGROUND

A number of techniques exist for developing and making changes to software code. GitHub, for example, provides a software development platform that enables communication and collaboration among software developers. The software development platform provided by GitHub allows software developers to create new software versions of software without disrupting a current version. Software development tasks often require coordination among a number of engineering teams that work on different portions of a larger software development project.

SUMMARY

In one embodiment, a method comprises obtaining one or more events related to one or more changes to software code; applying the one or more events to a machine learning prediction model that predicts a completion time of the one or more changes to the software code, wherein the machine learning prediction model is trained using (i) a plurality of events for a plurality of historical software code changes and (ii) a completion time for each historical software code change; and performing one or more automated remedial actions based at least in part on the predicted completion time.

In one or more embodiments, the one or more automated remedial actions comprise one or more of generating at least one notification responsive to the predicted completion time, and adjusting an allocation of resources assigned to the completion of at least one of the one or more changes to the software code. The one or more changes to the software code can be monitored and a new event related to the one or more changes to the software code can be applied to the machine learning prediction model to obtain an updated predicted completion time for the one or more changes to the software code.

In some embodiments, a predicted completion time can be obtained for each of a plurality of sets of changes to the software code within a project and the predicted completion time can be aggregated for each set of changes to obtain a predicted completion time for the project. In addition, a project may comprise a plurality of sets of changes to the software code and a predicted completion time for each set of changes within the project can be obtained and one or more sets of changes can be identified having a corresponding predicted completion time that occurs after a specified completion time for the project.

Other illustrative embodiments include, without limitation, apparatus, systems, methods and computer program products comprising processor-readable storage media.

BRIEF DESCRIPTION OF THE DRAWINGS

FIG. 3 illustrates a number of exemplary software development events that may be processed by the machine learning model of FIG. 1 in accordance with an illustrative embodiment;

FIG. 4 illustrates an exemplary product development tool dashboard in accordance with an illustrative embodiment;

FIG. 7 illustrates exemplary pseudo code for a training process for the machine learning prediction model of FIG. 1 in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for machine learning-based prediction of completion time of software code changes.

Figure 1:
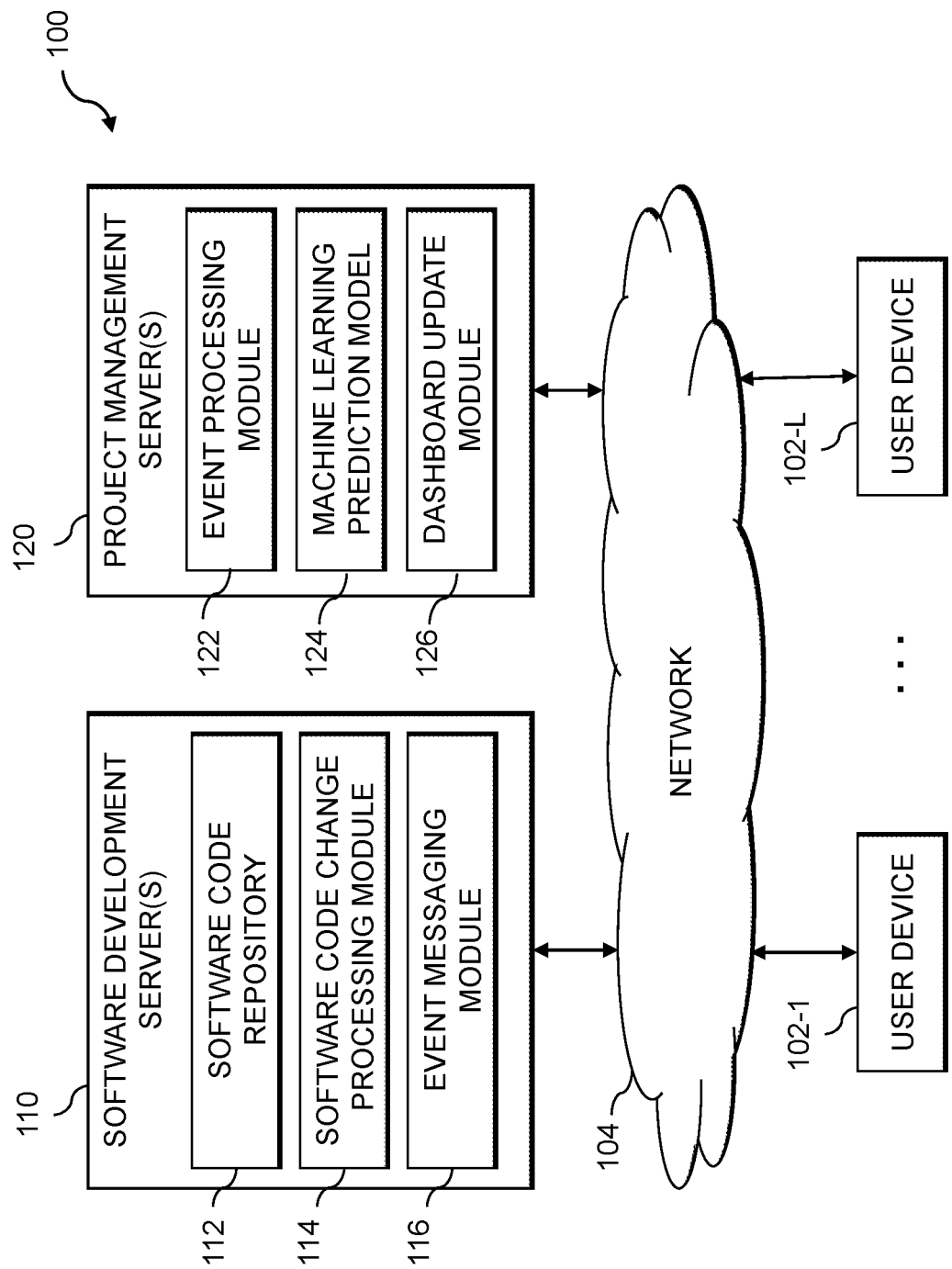
FIG. 1 illustrates an information processing system configured for machine learning-based prediction of completion time of software code changes in accordance with an illustrative embodiment.

FIG. 1 shows a computer network (also referred to herein as an information processing system) 100 configured in accordance with an illustrative embodiment. The computer network 100 comprises a plurality of user devices 102-1 through 102-L, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 are one or more software development servers 110 and one or more project management servers 120.

The user devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Also associated with the user devices 102 are one or more input-output devices, which illustratively comprise keyboards, displays or other types of input-output devices in any combination. Such input-output devices can be used, for example, to support one or more user interfaces to the user devices 102, as well as to support communication between the software development servers 110, the project management servers 120, and/or other related systems and devices not explicitly shown.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the software development servers 110 can have at least one associated database (not explicitly shown in FIG. 1) configured to store data pertaining to, for example, software code under development, events related to software code changes, reviewer information and/or reviewer comments. Each of the project management servers 120 can also have at least one associated database (not explicitly shown in FIG. 1) configured to store predicted and specified completion time data pertaining to, for example, software code changes being monitored by the project management servers 120.

The databases associated with the software development servers 110 and/or the project management servers 120 can be implemented using one or more corresponding storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Additionally, the software development servers 110 and the project management servers 120 in the FIG. 1 embodiment are assumed to be implemented using at least one processing device. Each such processing device generally comprises at least one processor and an associated memory, and implements one or more functional modules for controlling certain features of the software development servers 110 and/or the project management servers 120.

More particularly, the software development servers 110 and the project management servers 120 in this embodiment can each comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow for communication between the software development servers 110, the project management servers 120, and/or the user devices 102 over the network 104, and each illustratively comprises one or more conventional transceivers.

In the example of FIG. 1, the software development servers 110 may be implemented, at least in part, using the GitHub software development platform. The software development servers 110 may comprise a software code repository 112, a software code change processing module 114, and an event messaging module 116. Generally, the software code repository 112 comprises multiple versions of software, such as a current software version and one or more versions undergoing software development. The software code change processing module 114 may process changes to the software code, for example, using at least portions of the GitHub software development tool. In some embodiments, the event messaging module 116 generates events related to the software code changes (as described in more detail, for example, in conjunction with FIG. 3) and publishes the messages in a messaging layer of a sequential message queue, such as Kafka messaging layer or a messaging layer of another enterprise service bus. The messages may also be stored in a database, such as a NoSQL database (e.g., a MongoDB).

Also, the project management servers 120 may be implemented, at least in part, using the Jira™ product development tool that allows a project manager to monitor the progress of software development tasks. Each of the project management servers 120 may include an event processing module 122, a machine learning prediction model 124, and a dashboard update module 126. Generally, the event processing module 122 obtains and processes events corresponding to changes to software code being generated by the event messaging module 116 of the software development server 120. The event processing module 122 may transform the events into formats that are digestible by the machine learning prediction model 124, for example. In some embodiments, the machine learning prediction model 124 generates a predicted completion time for one or more changes to software code. The generated predicted completion times for the one or more changes to software code may be presented to one or more users, for example, using the dashboard update module 126 (as described in more detail in conjunction with, for example, FIG. 4).

In some embodiments, the machine learning prediction model 124 is trained using (i) a plurality of events for a plurality of historical software code changes and (ii) a completion time (e.g., as a label) for each historical software code change.

It is to be appreciated that the particular arrangement of elements 112-116 illustrated in the software development server(s) 110, and the particular arrangement of elements 122-126 in the project management server(s) 120 of the FIG. 1 embodiment is presented by way of example only, and alternative arrangements can be used in other embodiments. For example, the functionality associated with the elements 112-116 and/or elements 122-126 in other embodiments can be combined into a single element, or separated across a larger number of elements. As another example, multiple distinct processors can be used to implement different ones of the elements 112-116 and/or elements 122-126 or portions thereof.

At least portions of elements 112-116 and/or elements 122-126 may be implemented at least in part in the form of software that is stored in memory and executed by a processor.

It is to be understood that the particular set of elements shown in FIG. 1 for machine learning-based prediction of completion time of software code changes is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the software development servers 110 and at least one associated database can be on and/or part of the same processing platform.

An exemplary process utilizing elements 112-116 of an example software development server 110 in computer network 100 will be described in more detail with reference to, for example, FIGS. 3 and 6.

An exemplary process utilizing elements 122-126 of an example project management server 120 in computer network 100 will be described in more detail with reference to, for example, FIGS. 4 through 6.

Figure 2A:
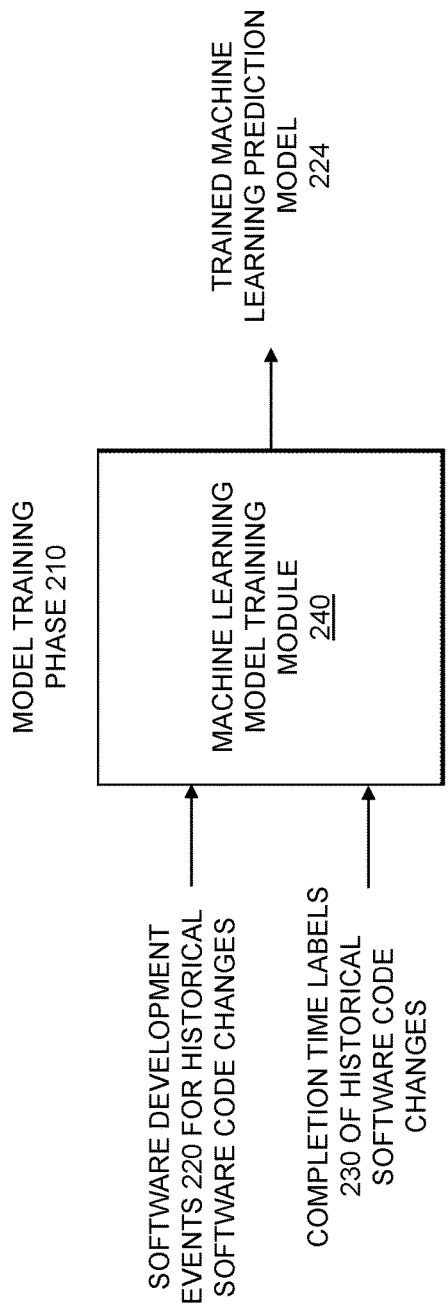
FIGS. 2A and 2B, respectively, illustrate a training phase and a prediction phase of the machine learning prediction model of FIG. 1 in accordance with illustrative embodiments.

FIG. 2A illustrates an exemplary model training phase 210 of the machine learning prediction model 124 of FIG. 1 according to one or more embodiments. In the example of FIG. 2A, historical changes to software code (e.g., from the software code repository 112) are processed to train the machine learning prediction model 124 to generate a trained machine learning prediction model 224. In particular, software development events 220 (e.g., as discussed further below in conjunction with FIG. 3) for the historical changes to the software code, together with actual completion time labels 230 for the historical changes to the software code, are applied to a machine learning model training module 240 that trains one or more machine learning models to generate a trained machine learning prediction model 224.

In this manner, the trained machine learning prediction model 224 has learned the lifetime of such software code changes based on the historical data and can predict the expected completion time with respect to such software code changes in order to provide project management teams with timely technical updates.

The trained machine learning prediction model 224 may be implemented, for example, as an LSTM network. The training may employ supervised learning techniques with outcome labels (e.g., observed completion time) with respect to the historical data. In this manner, the machine learning prediction model 224 can process single data points (e.g., an event), as well as sequences of data (e.g., events).

Figure 2B:
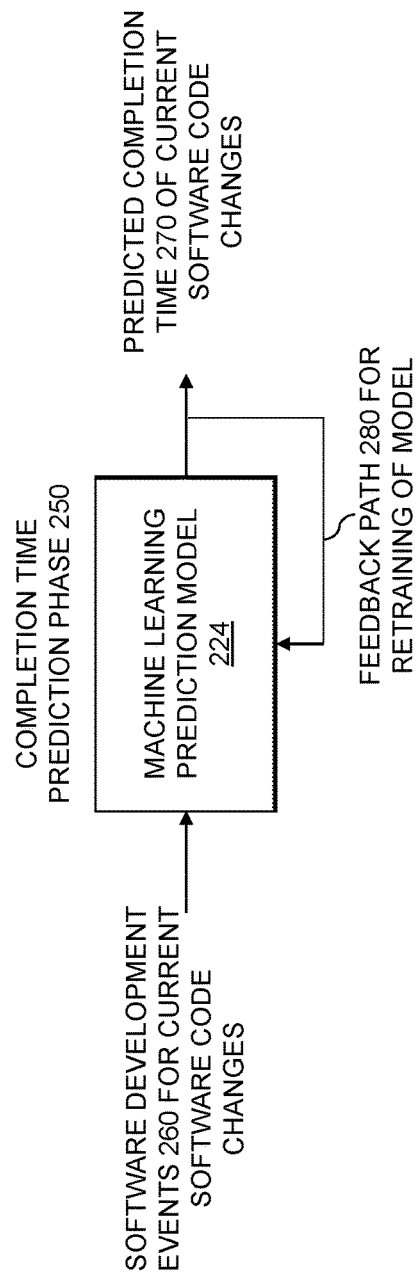

FIG. 2B illustrates an exemplary completion time prediction phase 250 of the machine learning prediction model 224 according to at least one embodiment. In the example of FIG. 2B, software development events 260 (e.g., as discussed further below in conjunction with FIG. 3) for current changes to the software code are applied to the machine learning prediction model 224, during the completion time prediction phase 250, in order to obtain the predicted completion time 270 of the current software code changes.

In at least some embodiments, a feedback path 280 is provided for a retraining of the machine learning prediction model 224. In this manner, as the scope of the sample data increases, the machine learning prediction model 224 learns and becomes more accurate.

Code branching provides a mechanism for working on different versions of a software code repository at one time. Branches can be used to experiment and to make changes before committing the changes to the main branch. In the GitHub software development platform, for example, a pull request (also referred to herein as a request to review software code changes) allows developers or other members of a development team to announce potential changes to software code that have been pushed to a branch in a repository on GitHub. Once such a pull request is opened, the potential changes can be evaluated, discussed and reviewed among collaborators before the potential changes are merged into a main code branch. In some embodiments, a given pull request can show differences between two code branches, such as the main code branch and the proposed changes.

In the GitHub software development platform, saved changes are referred to as commits. Each commit typically has an associated commit message, describing why a particular change was made. A merge request makes the approved software code changes available to the main branch.

As noted above, the project management servers 120 may be implemented, at least in part, using the Jira product development tool that allows a project manager to monitor the progress of software development tasks. In the context of the Jira product development tool, a user story may comprise an explanation of a software feature written from the perspective of the end user. The purpose of a Jira story is to articulate how a software feature will provide value to the customer. A "sprint" is a time period in a development cycle where an engineering team completes work, in a known manner.

One or more aspects of the disclosure recognize that there may be one or more pull requests to be reviewed or merged that are related to a Jira story and that experience unexpected delays. Such delays may require the program managers to adjust the timeline of the delayed pull requests themselves and/or the timeline of other implicated pull requests or tasks.

In one or more embodiments, machine learning-based techniques are provided for predicting completion times of software code changes that allow a project management team to dynamically track (and predict) the progress of pull requests and/or merge requests associated with outstanding user stories in a sprint, for example, using comments and/or activities in such pull/merge requests.

FIG. 3 illustrates a number of exemplary designated software development events 300 that may be processed by the machine learning model of FIG. 1, according to one or more embodiments of the disclosure. In the example of FIG. 3, the exemplary designated software development events 300 comprise a create branch event, a code change event, a commit change event, a pull request event, a reviewer comment event (or a sequence of reviewer comments), a merge request event, a continuous integration/continuous deployment event and/or a code analysis tool event. The designated software development events 300 may comprise webhook events and may be obtained from a messaging layer.

In at least some embodiments, the designated software development events 300 that are applied to the machine learning prediction model 124 in the completion time prediction phase 250 comprise events occurring between an opening of a pull request related to a review of one or more software code changes to a completion of pull request (e.g., when the one or more changes to the software code associated with the pull request are closed and merged into the main branch).

In one or more embodiments, the exemplary designated software development events 300 may be categorized into a first set of events from the GitHub software development platform and a second set of events from a code review platform, such as a continuous integration/continuous deployment (CICD) tool (e.g., the Jenkins open source automation server to modify and ensure the integrity of the code pipeline) and/or a code analysis tool (e.g., a code checker that performs code analysis to review source code lines prior to entering the production phase of a development project).

FIG. 4 illustrates an exemplary product development tool dashboard 400 for a Jira story related to one or more software code changes, according to some embodiments of the disclosure. In the example of FIG. 4, the dashboard 400 comprises an identifier for each pull request being monitored, as well as a corresponding predicted completion time flag (e.g., "on time" or "delayed") and any automated actions to be performed based on the current predicted completion time of any pull request.

For example, as shown in FIG. 4, pull request 3 has a predicted completion time flag of "delayed," since the predicted completion time occurs after the defined sprint closure date. Thus, an automated action may comprise sending a notification to the appropriate sprint team software indicating that pull request 3 needs additional attention (or resources) and/or recommending an allocation of additional resources to a completion of pull request 3.

Figure 5:
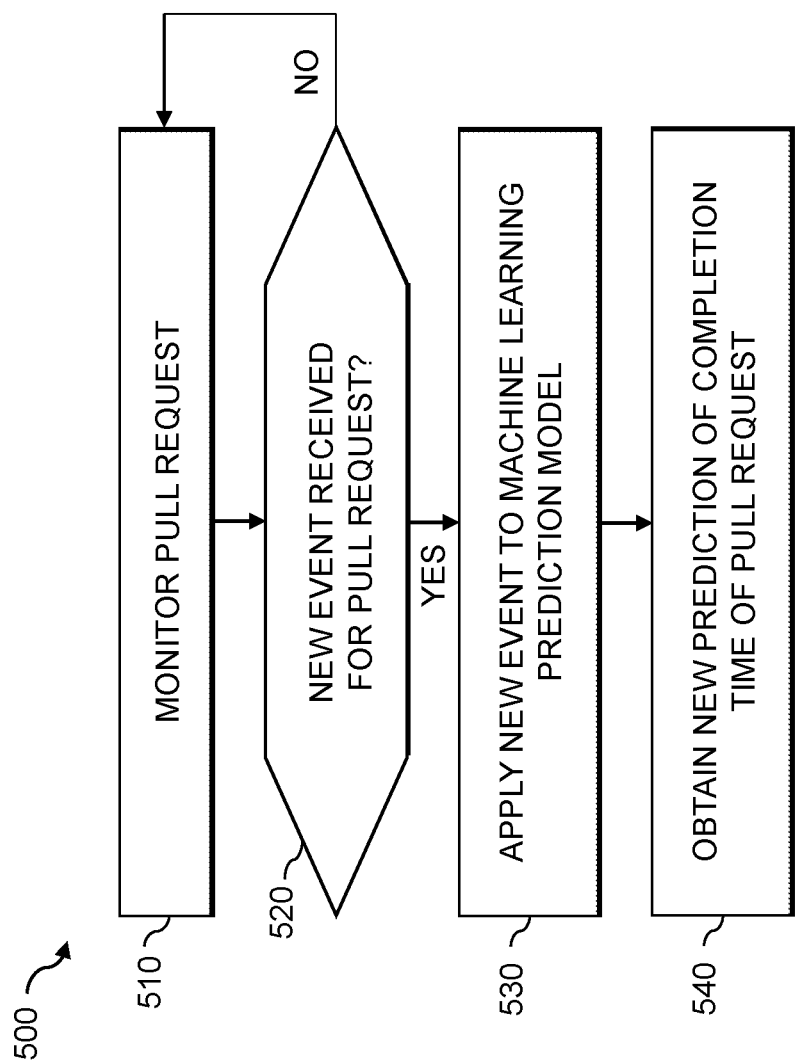
FIG. 5 is a flow diagram illustrating an exemplary process for monitoring a request to review software code changes and for generating a predicted completion time for the monitored software code changes in accordance with an illustrative embodiment.

FIG. 5 is a flow diagram illustrating an exemplary process 500 for monitoring a pull request related to software code changes and for generating a predicted completion time for the monitored pull request, according to at least one embodiment. In the example of FIG. 5, the process 500 initially monitors a given pull request in step 510.

A test is performed in step 520 to determine if a new event is received for the monitored pull request. If it is determined in step 520 that a new event is not received, then program control returns to step 510 to continue monitoring the pull request.

Once it is determined in step 520 that a new event is received, then the new event is applied in step 530 to the machine learning prediction model 124 and a new prediction of the completion time of the pull request is obtained in step 540.

Thus, at least in some embodiments, the disclosed machine learning-based prediction techniques predict the lifetime of outstanding software code changes (e.g., associated with pull/merge requests) based on the GitHub events. In this manner, as events happen on the monitored pull request, the estimated completion time can be dynamically updated.

Figure 6:
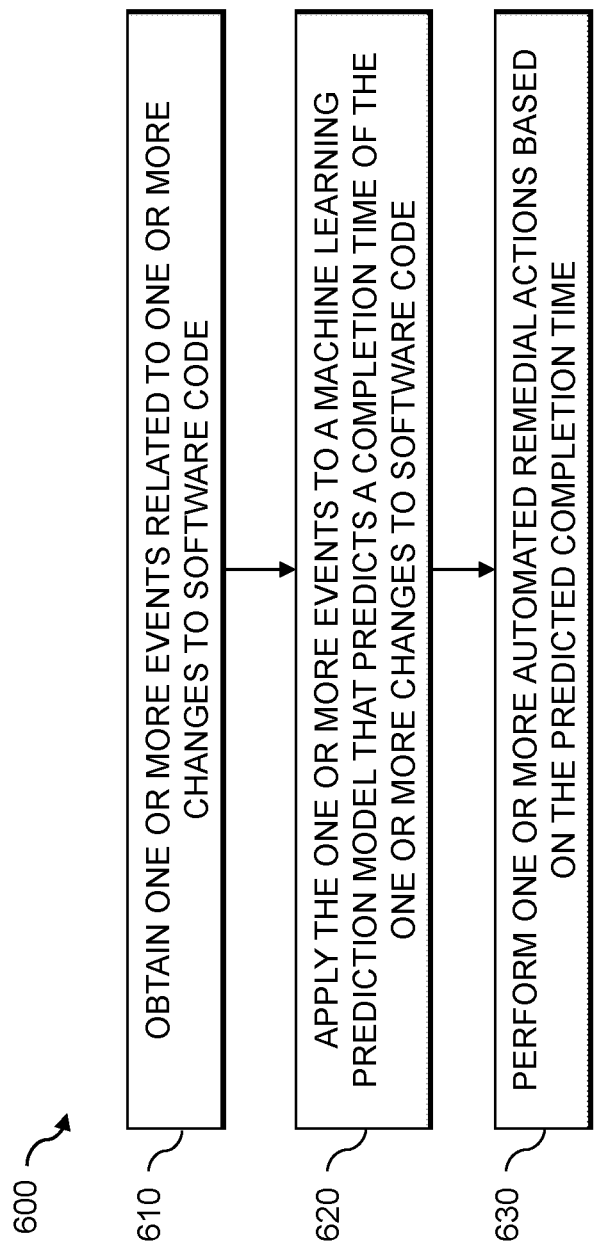
FIG. 6 is a flow diagram illustrating an exemplary implementation of a machine learning-based process for predicting completion times of software code changes in accordance with an illustrative embodiment.

FIG. 6 is a flow diagram illustrating an exemplary implementation of a machine learning-based process 600 for predicting completion times of software code changes, according to at least some embodiments. In the example of FIG. 6, the machine learning-based process 600 initially obtains one or more events in step 610 related to one or more changes to software code. In step 620, the one or more events are applied to a machine learning prediction model that predicts a completion time of the one or more changes to the software code. The machine learning prediction model can be trained, for example, using (i) a plurality of events for a plurality of historical software code changes and (ii) a completion time for each historical software code change.

In step 630, one or more automated remedial actions are performed based at least in part on the predicted completion time.

In some embodiments, the one or more events may comprise events occurring between an opening of a request to review the one or more changes to the software code and a completion of the one or more changes to the software code. The one or more events may be obtained, for example, from a messaging layer, such as a Kafka messaging layer. The one or more events may comprise, for example, a create branch event, a code change event, a commit change event, a pull request event, a reviewer comment event, a merge request event, a continuous integration/continuous deployment event and/or a code analysis tool event.

In one or more embodiments, the automated remedial actions performed in step 630 may comprise generating at least one notification responsive to the predicted completion time, and/or adjusting an allocation of resources assigned to the completion of the one or more changes to the software code.

In at least one embodiment, the one or more changes to the software code are monitored and a new event related to the one or more changes to the software code can be applied to the machine learning prediction model to obtain an updated predicted completion time for the one or more changes to the software code.

In addition, a predicted completion time can be obtained for each of a plurality of sets of changes to the software code (e.g., defined tasks with respect to the software code, such as separate pull requests) within a project (e.g., a Jira story) and the predicted completion time for each set of changes can be aggregated to obtain a predicted completion time for the project. When a project comprises a plurality of sets of changes to the software code, a predicted completion time can be obtained for each set of changes within the project and one or more sets of changes can be identified having a corresponding predicted completion time that occurs after a specified completion time for the project.

For example, assume there are four pull/merge requests associated with a Jira Story, each having a corresponding predicted completion time. If any of the predicted completion times of the four pull/merge requests falls after a defined sprint closure date, such pending pull/merge requests can be consolidated and a summary notification can be provided to the sprint team. In this manner, an automated mechanism is provided as a triggering point to review the pull/merge requests that need attention.

The particular processing operations and other network functionality described in conjunction with the flow diagrams of FIGS. 5 and 6 are presented by way of illustrative example only, and should not be construed as limiting the scope of the disclosure in any way. Alternative embodiments can use other types of processing operations for machine learning-based prediction of completion time of software code changes. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

FIG. 7 illustrates exemplary pseudo code for a training process 700 for the machine learning prediction model 124 of FIG. 1 in accordance with an illustrative embodiment. The example of FIG. 7 assumes that the machine learning prediction model 124 being trained is implemented as a two-layer LSTM model having an input layer and an output layer. In further embodiments, additional hidden layers may also be employed, as would be apparent to a person of ordinary skill in the art.

In the embodiment of FIG. 7, data from the software development server(s) 110 is separated into a training dataset and a testing dataset, for example, with a random distribution of 80% for the training dataset and 20% for the testing dataset. The data from the software development server(s) 110 for the training process 700 may comprise, for example, the software development events 220 of FIG. 2 for software code changes, together with the corresponding completion time labels 230 of the software code changes.

An input layer of the machine learning prediction model 124 can be trained with the training dataset and the training output of the input layer can be provided to the output layer of the machine learning prediction model 124. The machine learning prediction model 124 is trained by the training process 700 using the training data until the machine learning prediction model 124 achieves, for example, an accuracy value of 90% on the test data. In the example of FIG. 7, a maximum of 24 epochs (e.g., training iterations) is employed. For each epoch of the training process 700, the time difference between each subsequent pair of events in the training data is used to train the input layer of the machine learning prediction model 124. Once the accuracy value on the test data satisfies the specified accuracy criteria (e.g., an accuracy value of 90% on the test data), a "pass" status is applied to the training process 700 and the training process 700 terminates for the current training dataset.

Figure 8:
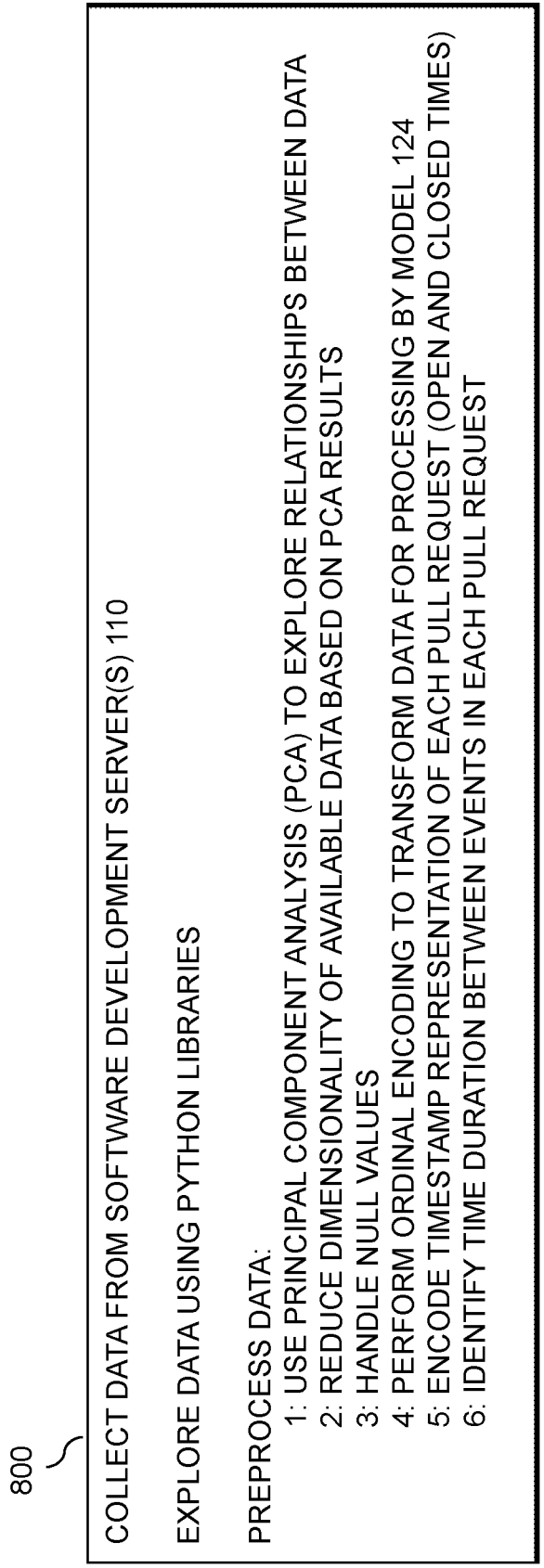
FIG. 8 illustrates exemplary pseudo code for a data engineering process that preprocesses the data for the machine learning prediction model of FIG. 1 in accordance with an illustrative embodiment.

FIG. 8 illustrates exemplary pseudo code for a data engineering process 800 that preprocesses the data for the machine learning prediction model of FIG. 1 in accordance with an illustrative embodiment. In the example of FIG. 8, the exemplary data engineering process 800 initially collects data from one or more software development servers 110 of FIG. 1 (e.g., version control systems). The collected data is then explored, for example, using one or more Python libraries (e.g., associated with Python version 3.10.0). For example, the seaborn and/or matplotlib Python libraries may be employed in some embodiments for data exploration.

The exemplary data engineering process 800 then preprocesses the collected data (e.g., to satisfy one or more data processing requirements of the machine learning prediction model 124). In the example of FIG. 8, the preprocessing may comprise employing Principal Component Analysis (PCA) to explore relationships between the collected data. The results from the PCA analysis are then used to reduce a dimensionality of the available data, for example, by reducing features from the collected data. Null values (and/or other unimportant data records) that are not needed to train the machine learning prediction model 124 may be removed from the collected data in some embodiments.

Ordinal encoding may then be applied to the remaining data (following removal of the unimportant data records), to transform the remaining data so that it can be processed by the machine learning prediction model 124. For example, binary or text values may be converted to categorical values. In addition, timestamp representations of each pull request (such as the difference between a pull request open time and a pull request closed time) may be encoded. For an exemplary feature "timestamp.format(pull request closed time–pull request open time)," where the open time is "24th November 12:30 PM," and the closed time is "25th November 12:30 PM," the timestamp representation may be expressed as 1440 minutes (24 hours multiplied by 60 minutes per hour). The time duration between each pair of subsequent events in each pull request is also identified (e.g., a delta time comprising the time duration between two events).

Figure 9:
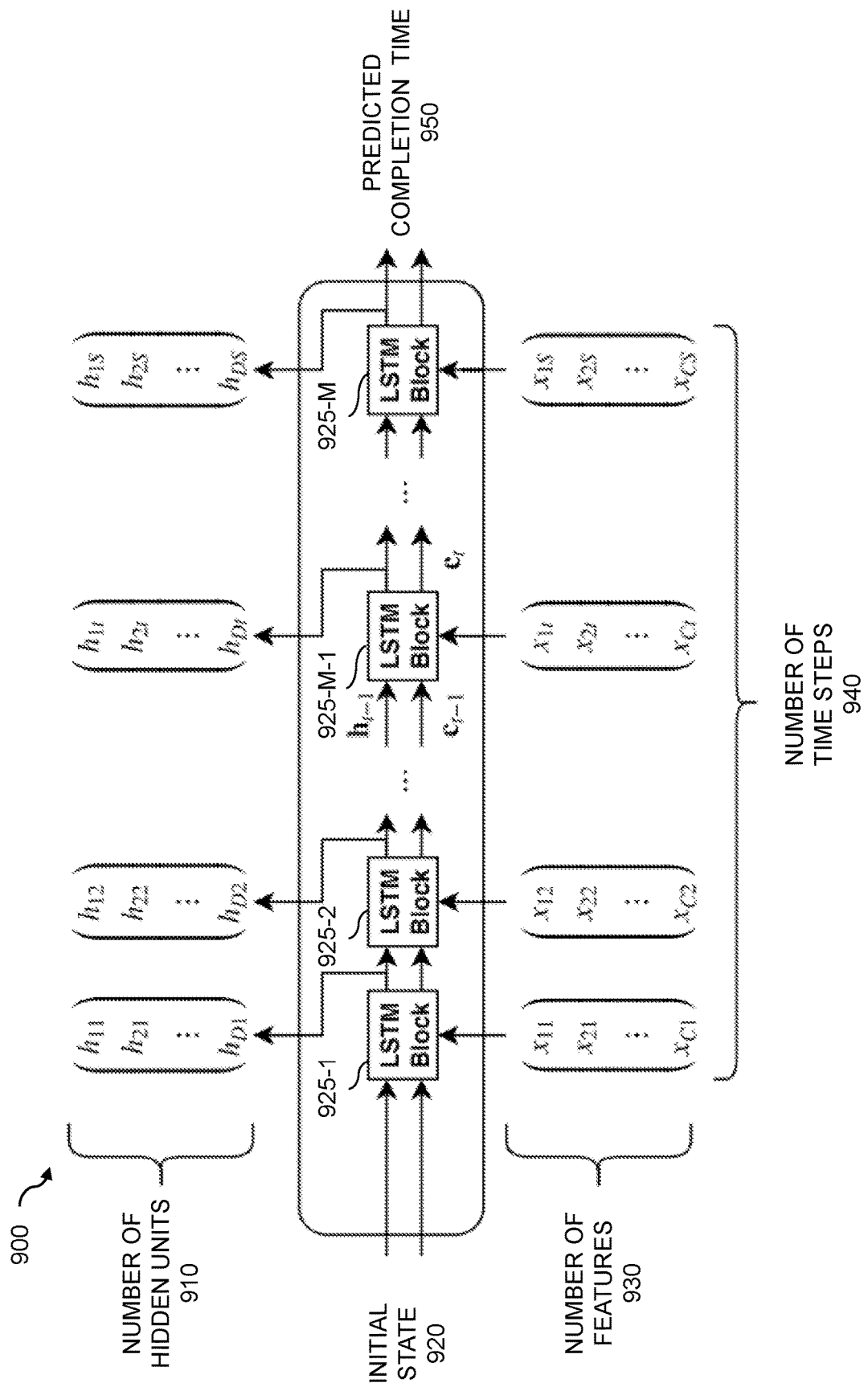
FIG. 9 shows an exemplary implementation of an exemplary long short-term memory (LSTM) network to predict software code change completion times in an illustrative embodiment.

One or more embodiments include utilizing one or more artificial intelligence (AI) techniques (such as a deep learning algorithm or model) to predict completion times of software code changes. By way of example, FIG. 9 shows an exemplary implementation of a deep learning model 900 to predict completion times 950 of software code changes in accordance with an illustrative embodiment. In the example embodiment depicted in FIG. 9, the deep learning model 900 includes an LSTM architecture which is comprised of one or more LSTM memory blocks 925-1 through 925-M, collectively referred to herein as LSTM memory blocks 925, that can be connected through layers. Each LSTM memory block 925 comprises three gates that manage a state and output of the respective LSTM memory block 925. In at least some embodiments, a given LSTM memory block 925 operates upon an input sequence and each gate within a LSTM memory block 925 uses sigmoid activation units to control whether the respective LSTM memory block 925 is triggered. Each of exemplary LSTM memory blocks 925 comprises a forget gate that conditionally decides the information to provide from the block; an input gate that conditionally decides the values from the input to update the memory state and an output gate that conditionally decides what value to output based on the input and the memory of the respective LSTM memory block 925.

In one or more embodiments, the gates of each LSTM memory block 925 have weights (e.g., $h_i$, $c_{i-1}$, $c_i$) that are learned during the model training phase 210 of FIG. 2. A given LSTM memory block 925 remembers values over arbitrary time intervals, and the three gates of each LSTM memory block 925 regulate the flow of information into and out of the cell in connection with a given number of hidden units 910, a given number of features 930, discussed hereinafter, and a given number of time steps 940. Such an example LSTM network is utilized in one or more embodiments to process and classify data, and generate one or more predictions of completion times 950 for software code changes based on the applied software development events 260 of FIG. 2.

In such an example embodiment as depicted in FIG. 9, input data associated with an initial state 920 can pertain to features extracted from the applied software development events 260. In one exemplary implementation, the following features were used: pull_request_draft; pull_request_base_user_login; software_changes; pull_request_base_repository_size; sender_login; pull_request_base_repository_name; repository_full_name; pull_request_base_repository_owner_type; pull_request_deletions; pull_request_title; pull_request_base_repository_open_issues; pull_request_head_repository_name; repository_owner_login; repository_forks; pull_request_head_repository_watchers; pull_request_url; pull_request_head_repository_has_issues; pull_request_head_reference; repository_open_issues; headers_x_github_delivery; organization_url; pull_request_assignee_url; comments; pull_request_mergeable_state; repository_private; pull_request_requested_teams; pull_request_assignee_login; pull_request_head_repository_owner_login; repository_watchers_count; pull_request_number; pull_request_author_association; repository_url; pull_request_changed_files; pull_request_merged_by_url; pull_request_head_repository_owner_url; pull_request_additions; pull_request_head_repository_forks_count; organization_login; action; pull_request_head_repository_url; pull_request_labels; pull_request_body; review_user_url; pull_request_comments; pull_request_user_url; headers_http_user_agent; pull_request_merged; pull_request_head_repository_open_issues; pull_request_user_login; pull_request_head_repository_watchers_count; review_state; pull_request_assignees; pull_request_head_user_type; pull_request_state; pull_request_base_repository_url; pull_request_head_repository_size; repository_owner_type; pull_request_base_repository_watchers; pull_request_base_repository_private; @timestamp; pull_request_base_label; review_author_association; pull_request_base_repository_owner_url; pull_request_base_repository_language; repository_open_issues_count; pull_request_base_repository_forks; pull_request_base_user_type; pull_request_head_repository_owner_type; pull_request_rebaseable; assignee; repository_size; pull_request_head_label; headers_x_github_event; repository_forks_count; pull_request_base_ref; pull_request_base_repository_default_branch; repository_language; pull_request_base_repository_watchers_count; pull_request_head_repository_private; pull_request_mergeable; pull_request_head_repository_full_name; pull_request_base_repository_full_name; pull_request_head_user_url; repository_description; pull_request_head_repository_description; pull_request_head_repository_default_branch; sender_url; repository_name; review_body; pull_request_base_repository_owner_login; review_user_login; pull_request_head_repository_fork; pull_request_head_user_login; pull_request_base_repository_forks_count; pull_request_head_repository_language; pull_request_head_repository_forks; pull_request_review_comments; pull_request_base_repository_open_issues_count; pull_request_base_user_url; headers_content_length; pull_request_merged_by_login; requested_team; requested_reviewer; repository_watchers; pull_request_commits; pull_request_requested_reviewers; repository_default_branch; pull_request_head_repository_open_issues_count; repository_owner_url; and pull_request_base_repository_description.

In the example embodiment of FIG. 9, the exemplary deep learning model 900 outputs a predicted completion time of one or more software code changes. It is noted that the particular arrangement of elements shown in FIG. 9 are presented by way of illustrative example only, and a wide variety of alternative machine learning models can be used in other embodiments, as would be apparent to a person of ordinary skill in the art.

One or more embodiments of the disclosure provide improved methods, apparatus and computer program products for machine learning-based prediction of completion time of software code changes. The foregoing applications and associated embodiments should be considered as illustrative only, and numerous other embodiments can be configured using the techniques disclosed herein, in a wide variety of different applications.

It should also be understood that the disclosed techniques for predicting completion times for changes to software code, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for machine learning-based prediction of completion time of software code changes may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services and/or storage services can be offered to cloud infrastructure tenants or other system users as a Platform as a service (PaaS) model, an Infrastructure as a service (IaaS) model, a Storage-as-a-Service (STaaS) model and/or a Function-as-a-Service (FaaS) model, although numerous alternative arrangements are possible. Also, illustrative embodiments can be implemented outside of the cloud infrastructure context, as in the case of a stand-alone computing and storage system implemented within a given enterprise.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based software code change completion time prediction engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based software code change completion time prediction platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. These platforms may also be used to implement at least portions of other information processing systems in other embodiments.

Figure 10:
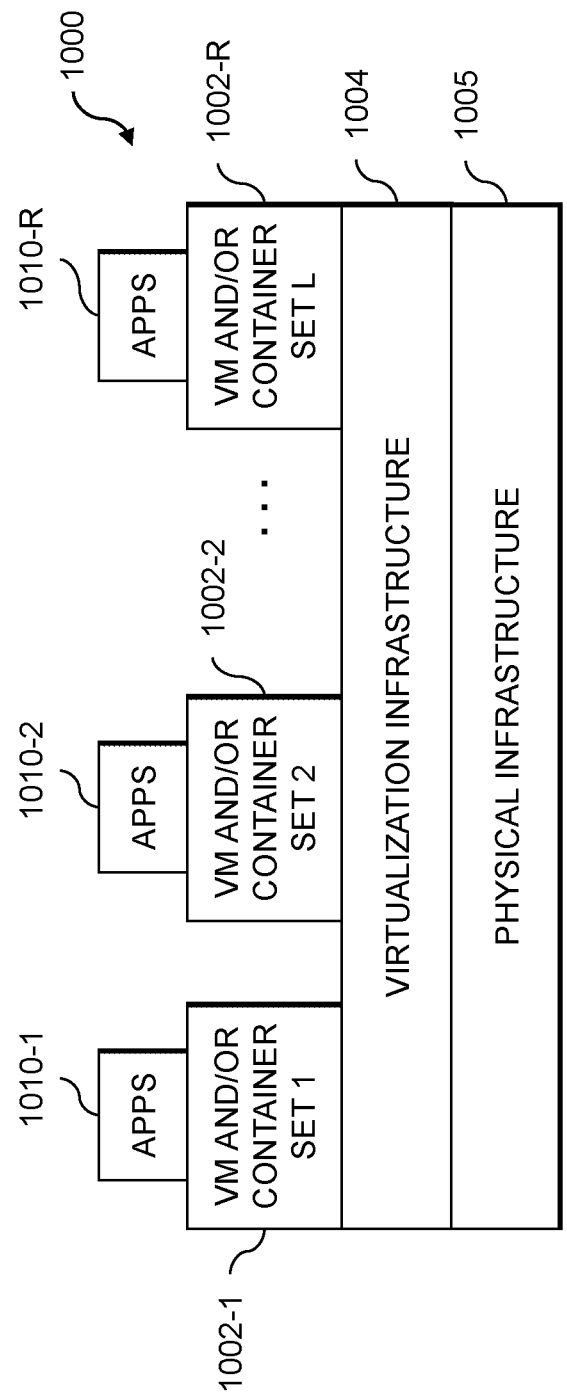
FIG. 10 illustrates an exemplary processing platform that may be used to implement at least a portion of one or more embodiments of the disclosure comprising a cloud infrastructure.

FIG. 10 shows an example processing platform comprising cloud infrastructure 1000. The cloud infrastructure 1000 comprises a combination of physical and virtual processing resources that may be utilized to implement at least a portion of the information processing system 100. The cloud infrastructure 1000 comprises multiple virtual machines (VMs) and/or container sets 1002-1, 1002-2, . . . 1002-R implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-R running on respective ones of the VMs/container sets 1002-1, 1002-2, . . . 1002-R under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. Such implementations can provide software code change completion time prediction functionality of the type described above for one or more processes running on a given one of the VMs. For example, each of the VMs can implement machine learning-based prediction control logic and associated functionality for evaluating predicted completion times for one or more processes running on that particular VM.

An example of a hypervisor platform that may be used to implement a hypervisor within the virtualization infrastructure 1004 is the VMware® vSphere® which may have an associated virtual infrastructure management system such as the VMware® vCenter™. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system. Such implementations can provide machine learning-based prediction functionality of the type described above for one or more processes running on different ones of the containers. For example, a container host device supporting multiple containers of one or more container sets can implement one or more instances of machine learning-based prediction control logic and associated functionality for evaluating predicted completion times.

As is apparent from the above, one or more of the processing modules or other components of information processing system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises at least a portion of the given system and includes a plurality of processing devices, denoted 1102-1, 1102-2, 1102-3, . . . 1102-K, which communicate with one another over a network 1104. The network 1104 may comprise any type of network, such as a WAN, a LAN, a satellite network, a telephone or cable network, a cellular network, a wireless network such as WiFi or WiMAX, or various portions or combinations of these and other types of networks.

The processing device 1102-1 in the processing platform 1100 comprises a processor 1110 coupled to a memory 1112. The processor 1110 may comprise a microprocessor, a microcontroller, an ASIC, an FPGA or other type of processing circuitry, as well as portions or combinations of such circuitry elements, and the memory 1112, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and the given system may include additional or alternative processing platforms, as well as numerous distinct processing platforms in any combination, with each such platform comprising one or more computers, storage devices or other processing devices.

Figure 11:
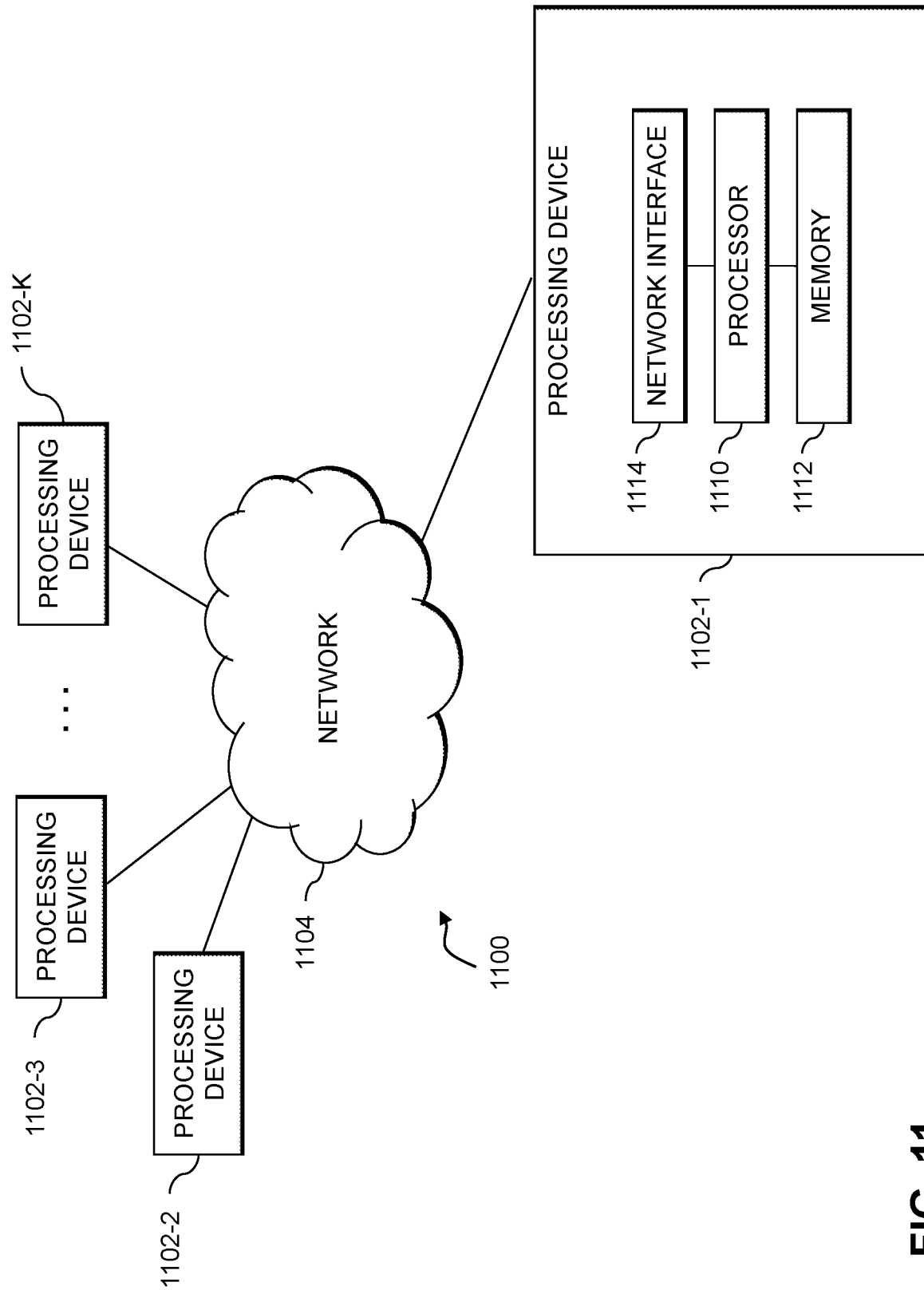
FIG. 11 illustrates another exemplary processing platform that may be used to implement at least a portion of one or more embodiments of the disclosure.

Multiple elements of an information processing system may be collectively implemented on a common processing platform of the type shown in FIG. 10 or 11, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    in response to obtaining one or more designated events in a software development environment related to one or more changes to software code made in one or more branches of the software code in the software development environment, wherein the one or more designated events in the software development environment comprise one or more of a create branch event, a code change event, a commit change event, a pull request event, a reviewer comment event, a merge request event, a continuous integration/continuous deployment event and a code analysis tool event:
    applying at least some of the one or more designated events to a machine learning prediction model that predicts a completion time of the one or more changes to the software code, wherein the machine learning prediction model is trained to predict the completion time using (i) one or more historical events for respective ones of a plurality of historical software code changes and (ii) a completion time label, used for a supervised learning of the machine learning prediction model, for each historical software code change, wherein the completion time label for each historical software code change indicates a completion time of the respective historical software code change, and wherein the completion time of a given historical software code change corresponds to a time when the given historical software code change, in the one or more branches of the software code in the software development environment, is merged with a main branch of the software code in the software development environment, wherein the one or more branches of the software code are distinct from the main branch of the software code; and
    performing one or more automated actions based at least in part on the predicted completion time;
    wherein the method is performed by at least one processing device comprising a processor coupled to a memory.

2. The method of claim 1, wherein the one or more designated events in the software development environment comprise events occurring between an opening of a request to review the one or more changes to the software code and a completion of the one or more changes to the software code.

3. The method of claim 1, wherein the one or more designated events in the software development environment are obtained from a messaging layer of a sequential message queue.

4. The method of claim 1, wherein the one or more automated actions comprise one or more of generating at least one notification responsive to the predicted completion time, and adjusting an allocation of resources assigned to the completion of at least one of the one or more changes to the software code.

5. The method of claim 1, further comprising monitoring the one or more changes to the software code and applying a new event related to the one or more changes to the software code to the machine learning prediction model to obtain an updated predicted completion time for the one or more changes to the software code.

6. The method of claim 1, further comprising obtaining a predicted completion time for each of a plurality of sets of changes to the software code within a project and aggregating the predicted completion time for each set of changes to obtain a predicted completion time for the project.

7. The method of claim 1, wherein a project comprises a plurality of sets of changes to the software code and further comprising obtaining a predicted completion time for each set of changes within the project and identifying one or more sets of changes having a corresponding predicted completion time that occurs after a specified completion time for the project.

8. The method of claim 1, further comprising preprocessing at least some data related to the at least some of the one or more designated events to satisfy one or more data processing criteria of the machine learning prediction model.

9. An apparatus comprising:
at least one processing device comprising a processor coupled to a memory;
the at least one processing device being configured to implement the following steps:
in response to obtaining one or more designated events in a software development environment related to one or more changes to software code made in one or more branches of the software code in the software development environment, wherein the one or more designated events in the software development environment comprise one or more of a create branch event, a code change event, a commit change event, a pull request event, a reviewer comment event, a merge request event, a continuous integration/continuous deployment event and a code analysis tool event;
applying at least some of the one or more designated events to a machine learning prediction model that predicts a completion time of the one or more changes to the software code, wherein the machine learning prediction model is trained using (i) one or more historical events for respective ones of a plurality of historical software code changes and (ii) a completion time label, used for a supervised learning of the machine learning prediction model, for each historical software code change, wherein the completion time label for each historical software code change indicates a completion time of the respective historical software code change, and wherein the completion time of a given historical software code change corresponds to a time when the given historical software code change, in the one or more branches of the software code in the software development environment, is merged with a main branch of the software code in the software development environment, wherein the one or more branches of the software code are distinct from the main branch of the software code; and
performing one or more automated actions based at least in part on the predicted completion time.

10. The apparatus of claim 9, wherein the one or more designated events in the software development environment comprise events occurring between an opening of a request to review the one or more changes to the software code and a completion of the one or more changes to the software code.

11. The apparatus of claim 9, wherein the one or more automated actions comprise one or more of generating at least one notification responsive to the predicted completion time, and adjusting an allocation of resources assigned to the completion of at least one of the one or more changes to the software code.

12. The apparatus of claim 9, further comprising monitoring the one or more changes to the software code and applying a new event related to the one or more changes to the software code to the machine learning prediction model to obtain an updated predicted completion time for the one or more changes to the software code.

13. The apparatus of claim 9, further comprising obtaining a predicted completion time for each of a plurality of sets of changes to the software code within a project and aggregating the predicted completion time for each set of changes to obtain a predicted completion time for the project.

14. The apparatus of claim 9, wherein a project comprises a plurality of sets of changes to the software code and further comprising obtaining a predicted completion time for each set of changes within the project and identifying one or more sets of changes having a corresponding predicted completion time that occurs after a specified completion time for the project.

15. A non-transitory processor-readable storage medium having stored therein program code of one or more software programs, wherein the program code when executed by at least one processing device causes the at least one processing device to perform the following steps:
in response to obtaining one or more designated events in a software development environment related to one or more changes to software code made in one or more branches of the software code in the software development environment, wherein the one or more designated events in the software development environment comprise one or more CI/CD events of a create branch event, a code change event, a commit change event, a pull request event, a reviewer comment event, a merge request event, a continuous integration/continuous deployment event and a code analysis tool event;
applying at least some of the one or more designated events to a machine learning prediction model that predicts a completion time of the one or more changes to the software code, wherein the machine learning prediction model is trained using (i) one or more historical events for respective ones of a plurality of historical software code changes and (ii) a completion time label, used for a supervised learning of the machine learning prediction model, for each historical software code change, wherein the completion time label for each historical software code change indicates a completion time of the respective historical software code change, and wherein the completion time of a given historical software code change corresponds to a time when the given historical software code change, in the one or more branches of the software code in the software development environment, is merged with a main branch of the software code in the software development environment, wherein the one or more branches of the software code are distinct from the main branch of the software code; and
performing one or more automated actions based at least in part on the predicted completion time.

16. The non-transitory processor-readable storage medium of claim 15, wherein the one or more automated actions comprise one or more of generating at least one notification responsive to the predicted completion time, and adjusting an allocation of resources assigned to the completion of at least one of the one or more changes to the software code.

17. The non-transitory processor-readable storage medium of claim 15, further comprising monitoring the one or more changes to the software code and applying a new event related to the one or more changes to the software code to the machine learning prediction model to obtain an updated predicted completion time for the one or more changes to the software code.

18. The non-transitory processor-readable storage medium of claim 15, further comprising obtaining a predicted completion time for each of a plurality of sets of changes to the software code within a project and aggregating the predicted completion time for each set of changes to obtain a predicted completion time for the project.

19. The non-transitory processor-readable storage medium of claim 15, wherein a project comprises a plurality of sets of changes to the software code and further comprising obtaining a predicted completion time for each set of changes within the project and identifying one or more sets of changes having a corresponding predicted completion time that occurs after a specified completion time for the project.

20. The non-transitory processor-readable storage medium of claim 15, wherein the one or more designated events in the software development environment are obtained from a messaging layer of a sequential message queue.

* * * * *